(12) United States Patent
Scherzer et al.

(10) Patent No.: US 6,355,763 B1
(45) Date of Patent: Mar. 12, 2002

(54) EPOXY RESIN, POLYAMINE HARDENER AND N,N',N"-TRIS(DIALKYLAMINOALKYL) HEXAHYDROTRIAZINE

(75) Inventors: Wolfgang Scherzer, Bergkamen; Jörg Volle, Bork, both of (DE)

(73) Assignee: Vantico GmbH & Co. KG, Bergkamen (DE)

( * ) Notice: Subject to any disclaimer, the term of this patent is extended or adjusted under 35 U.S.C. 154(b) by 0 days.

(21) Appl. No.: 09/402,980

(22) PCT Filed: Jan. 22, 1998

(86) PCT No.: PCT/EP98/00327

§ 371 Date: Dec. 2, 1999

§ 102(e) Date: Dec. 2, 1999

(87) PCT Pub. No.: WO98/46660

PCT Pub. Date: Oct. 22, 1998

(30) Foreign Application Priority Data

Apr. 16, 1997 (EP) .............................................. 97106231

(51) Int. Cl.[7] ........................ C08G 59/50; C08G 59/54; C08G 59/68; C08L 63/02
(52) U.S. Cl. ........................ 528/94; 525/423; 525/486; 525/504; 525/526; 528/118
(58) Field of Search ........................ 528/94, 121, 118; 525/486, 504, 526, 423

(56) References Cited

U.S. PATENT DOCUMENTS

| | | | |
|---|---|---|---|
| 4,228,310 A | 10/1980 | Speranza et al. | 568/620 |
| 4,728,384 A | * 3/1988 | Goel | 528/73 |
| 4,740,539 A | * 4/1988 | Goel | 528/73 |

FOREIGN PATENT DOCUMENTS

| | | | |
|---|---|---|---|
| EP | 0019161 | | 11/1980 |
| EP | 0365479 | | 4/1990 |
| JP | 54-83096 A | * | 7/1979 |
| JP | 59-232117 A | * | 12/1984 |
| JP | 8-302280 A2 | * | 11/1996 |

OTHER PUBLICATIONS

Chem. Abstr. 102:221666 for JP 59232117, Jul. 2, 1979.
Chem. Abstr. 91:212190 for JP 54083096, Dec. 26, 1984.

* cited by examiner

*Primary Examiner*—Robert E. L. Sellers
(74) *Attorney, Agent, or Firm*—Lyon & Lyon LLP

(57) ABSTRACT

The invention relates to curable mixtures based on epoxy resins and aminic hardeners and cure accelerators, and, optionally solvents, plasticisers, UV stabilisers, dyes, pigments and/or fillers, wherein there is used as cure accelerator from 1 to 20% by weight, based on epoxy resin, of at least one heterocyclic compound of the general formula (I)

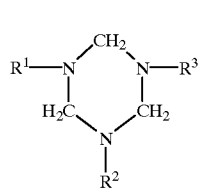

wherein $R^1$, $R^2$ and $R^3$, which may be the same or different, are

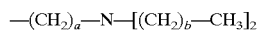

—$(CH_2)_a$—N—[$(CH_2)_b$—$CH_3$]$_2$ radicals in which a=2 or 3 and b=0 or 1.

5 Claims, No Drawings

EPOXY RESIN, POLYAMINE HARDENER AND N,N',N"-TRIS(DIALKYLAMINOALKYL) HEXAHYDROTRIAZINE

The invention relates to curable mixtures of glycidyl compounds and aminic hardeners, which comprise heterocyclic tertiary amines as cure accelerators and which, while having a long potlife, still have a rapid full cure rate.

Curable mixtures based on glycidyl compounds and aminic hardeners are widely used in industry for coating and improving the quality of metallic and mineral surfaces.

The amines used are especially aliphatic, cycloaliphatic, aromatic or araliphatic compounds, and also polyaminoamides, based on mono- or poly-basic acids, which may or may not contain imidazoline groups, as well as adducts thereof with epoxy resins.

Such compounds are described in Lee & Neville, Handbook of Epoxy Resins, 1967, Chapters 6/1 to 10/19.

Although the curable mixtures based on epoxy resins and such amine compounds usually have an adequately long potlife, once they have been applied to the various substrates their curing rate is for many fields of use too slow.

In addition, the viscosity of many compounds, especially the viscosity of the higher epoxy resin adducts and of the polyaminoamides or adducts thereof, is relatively high, especially in the low temperature range.

The curing rate can be increased by the addition of suitable cure accelerators.

For that purpose, in some systems Mannich bases of tertiary amines, such as, for example tris(dimethylaminomethyl)phenol (DMP30), are used.

A disadvantage of such compounds, however, is that they cannot be used for a large number of applications because of their strong tendency to yellow and their relatively high viscosity and also, especially, their substantially curtailed potlife.

For that reason, in some applications phenol-free accelerators that contain at least one tertiary amine group are employed. A typical representative of that class is dimethylaminopropylamine. Although some of the above-mentioned problems, such as, for example, the tendency to yellow, are not so pronounced, such accelerators likewise have the disadvantage that, while the curing rate is appreciably increased, the pottife is substantially shortened.

The problem underlying the present invention is therefore to make available curable mixtures, based on epoxy resins and amines, that have a comparatively low viscosity and in which the accelerators do not have a tendency to yellow, that are toxicologically harmless and, while having comparably long or prolonged potlives, have an appreciably faster curing rate than the non-accelerated mixtures, and of which the physical, mechanical and optical properties remain at a high level.

This problem is solved by curable mixtures based on epoxy resins and conventional aminic hardeners that comprise as cure accelerators heterocyclic amines which can be prepared by the reaction of formaldehyde with amines, each of which contains a primary and a tertiary amine group.

The invention accordingly relates to curable mixtures based on epoxy resins and aminic hardeners, where appropriate with the concomitant use of solvents, plasticisers, UV stabilisers, dyes, pigments, fillers, wherein there is used as cure accelerator from 1 to 20% by weight, based on epoxy resin, of at least one heterocyclic compound of the general formula (I)

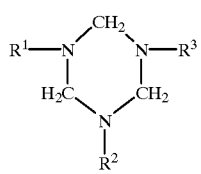

wherein $R^1$, $R^2$ and $R^3$, which may be the same or different, are

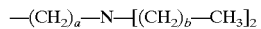

radicals in which a=2 or especially 3 and b=1 or especially 0.

The invention relates also to curable mixtures consisting of:
a) from 30 to 70% by weight, based on epoxy resin+hardeners, of epoxy resin having an EP value of from 0.4 to 0.56
b) from 25 to 70% by weight, based on epoxy resin+hardeners, of aminic hardeners
c) from 1 to 10% by weight, based on epoxy resin, of cure accelerator of the general formula (I).

Further subjects of the invention are characterised by the claims.

The heterocyclic amines used in accordance with the invention can be prepared by the reaction of formaldehyde with amines of the general formula (II)

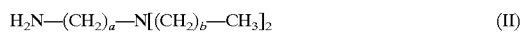

wherein a and b are as defined above, in a molar ratio of formaldehyde to amine of from 0.9:1 to, preferably, 1:1.

The preparation is generally carried out by introducing the amine into a reaction vessel and adding formaldehyde, preferably paraformaldehyde, thereto in portions. The reaction proceeds exothermically. The addition of the aldehyde is therefore controlled in such a manner that a reaction temperature of approximately 100° C. is not exceeded. According to the invention, the reaction is carried out preferably at a temperature of approximately from 30° to 80° C. The water of reaction formed is removed from the reaction mixture after the whole amount of the formaldehyde has been added, its removal being effected by increasing the temperature to approximately 130° C. and, if necessary, applying reduced pressure. The residue which remains can be used as cure accelerator without further purification.

The epoxide compounds used in accordance with the invention are customary commercial products having more than one epoxy group per molecule that are derived from mono- or/and poly-hydric, mono- or/and poly-nuclear phenols, especially bisphenols, and novolaks. A comprehensive list of such di- or poly-phenols may be found in the handbook "Epoxidverbindungen und Epoxidharze" by A. M. Paquin, Springer Verlag, Berlin, 1958, Chapter IV, and Lee & Neville "Handbook of Epoxy Resins", 1967, Chapter 2.

It is also possible to use mixtures of two or more of the epoxy resins. Preference is given to glycidyl compounds based on bisphenol A (4,4'-dihydroxy-diphenylpropane-2,2) having epoxy values of from 0.4 to 0.56.

It is also possible to use mixtures of the epoxy resins with so-called reactive diluents, such as, for example, monoglycidyl ethers of phenols or mono- or di-functional aliphatic or cycloaliphatic alcohols. Such reactive diluents are used especially to reduce viscosity and should be employed only in small amounts since they have an adverse effect on the final properties of the duromer.

The epoxy resins mentioned by way of example can be used both for the curable combinations and for the preparation of the hardener/epoxide adducts that are likewise suitable for use in the process according to the invention.

The hardeners used in accordance with the invention are aliphatic, cycloaliphatic, araliphatic or aromatic amines, aminoamides, which may or may not contain imidazoline groups, and adducts thereof with glycidyl compounds, containing more than two reactive amine hydrogen atoms per molecule. Those compounds form part of the general state of the art and are described, for example, in Lee & Neville, "Handbook of Epoxy Resins", McGraw Hill Book Company, 1967, Chapters 6 to 10.

For the purpose of coating metal or mineral substrates, preference is given to the use of cycloaliphatic amines or polyaminoamides based on mono- or poly-basic carboxylic acids and polyalkylenepolyamines, and also adducts thereof with glycidyl compounds.

Such hardeners are customary commercial products and are marketed, for example, by Witco GmbH under the trade mark EUREDUR®, especially EUREDUR (ED) 43, ED 46, ED 350.

Hardeners and epoxide compounds are used in the process according to the invention preferably in approximately equivalent amounts, that is, based on active amine hydrogen atoms and reactive epoxy groups. It is, however, also possible to use hardeners or glycidyl components in excess or in less than the stoichiometric amount. The amounts of each are generally in the range of approximately from 10 to 200% by weight based on glycidyl compounds, and are governed by the desired final properties of the reaction product. Conventional catalytic hardeners for epoxy resins can be used alongside the cure accelerators, according to the invention.

Generally, the cure accelerators according to the invention and the conventional catalytic or reactive hardeners can be added in the desired ratio to the epoxide compound separately or in the form of a mixture.

The mixing ratio of glycidyl compound to the cure accelerators of formula I used in accordance with the invention is governed by the particular compound being used and the desired final properties of the cured end products.

When liquid glycidyl ethers based on bisphenol A or bisphenol F having epoxy values from approximately 0.50 to approximately 0.56 are used, the amount of accelerator employed will generally be from 1 to 20% by weight, based on glycidyl ether; preferred according to the invention is an amount of approximately from 3 to 10% by weight.

The particular advantage of the curable mixtures according to the invention is their excellent curing behaviour at temperatures of from 10 to 40° C. and at high relative humidity values of up to approximately 95%.

Depending, on the field of use and the intended purpose, inorganic and/or organic additives may be added to the epoxy resin/hardener mixtures according to the invention, such as finely particulate sands, talc, silicic acid, clay, metals or metal compounds in the form of filings or powder, thixotropic agents, fibrous substances, such as, for example, asbestos and glass staple fibres, pigments, flame-retardant materials, solvents, dyes, plasticisers, bitumen and mineral oils.

The curable mixtures according to the invention can be used for coating absorbent or non-absorbent substrates, such as, for example, natural stones, marble, concrete, metals, glass.

Analytical Methods

Viscosity

Measured using, a Haake rotary viscometer RV 20 according to the manufacturer's instructions.

Colour number

Measured according to DIN 53 995 using a Lovibond colour-measuring apparatus (Hazen Farbzahl, APHA).

Amine number

Measured according to DIN 16 945

Tecam value

Value for the gelling time, measured using a Tecam Gelation Timer GT3 from Techne, Cambridge, GB, at 23° C. and 50% relative humidity. Specimen mixture of resin and hardener and accelerator=250 g.

Shore D Hardness

Measured with an apparatus of the type 38009 from Karl Frank GmbH after 1, 2, 3 and 7 days using test specimens having a diameter of 30 mm and a thickness of 6 mm.

EXAMPLES

Example 1

102 g (1 mol) of dimethylaminopropylamine are introduced into a reaction vessel and heated to approximately 30° C. With vigorous stirring, 30 g (1 mol) of paraformaldehyde are added in 3 portions, each of approximately 10 g, in such a manner that the temperature does not exceed 80° C. (exothermic reaction).

The mixture is then left to react for approximately 30 minutes until a clear reaction product free from solids has formed. The reaction product is then heated. Distillation of the water formed commences from a temperature at the base of approximately 102° C. The temperature is increased over a period of approximately 30 minutes to 130° C. At 130° C. the mixture is stirred for 30 minutes and the pressure is subsequently reduced to 1 mbar in order to free the product of residual water and residual free dimethylaminopropylamine.

The total distillate is approximately 19 g. The vacuum is then relieved with nitrogen and the reaction product is left to cool.

| Analytical values: | |
|---|---|
| Amine number: | approximately 980 mg of KOH/g |
| Viscosity/25° C.: | 29 mPa·s |
| Colour number: | 30 (APHA) |

Example 2

The following are reacted in accordance with Example 1:

130 g of diethylaminopropylamine 30 g of paraformaldehyde

| Analytical values: | |
|---|---|
| Amine number: | approximately 790 mg of KOH/g |
| Viscosity/25° C.: | 39 mPa·s |
| Colour number: | 35 (APHA) |

Example 3

The following are reacted in accordance with Example 1:

116 g of diethylaminoethylamine 30 g of paraformaldehyde

| Analytical values: | |
|---|---|
| Amine number: | approximately 1100 mg of KOH/g |
| Viscosity/25° C.: | 24 mPa·s |
| Colour number: | 30 (APHA) |

Example 4

The following are reacted in accordance with Example 1:

260 g of diethylaminopropylamine 102 g of dimethylaminopropylamine 90 g of paraformaldehyde

| Analytical values: | |
|---|---|
| Amine number: | approximately 840 mg of KOH/g |
| Viscosity/25° C.: | 36 mPa·s |
| Colour number: | 30 (APHA) |

Example 5

The following are reacted in accordance with Example 1:

130 g of diethylaminopropylamine 204 g of dimethylaminopropylamine 90 g of paraformaldehyde

| Analytical values: | |
|---|---|
| Amine number: | approximately 900 mg of KOH/g |
| Viscosity/25° C.: | 33 mPa·s |
| Colour number: | 35 (APHA) |

Example 6

The following are reacted in accordance with Example 1:

195 g of diethylaminopropylamine 153 g of dimethylaminopropylamine 90 g of paraformaldehyde

| Analytical values: | |
|---|---|
| Amine number: | approximately 870 mg of KOH/g |
| Viscosity/25° C.: | 34 Pa·s |
| Colour number: | 30 (APHA) |

Example 7

The following are reacted in accordance with Example 1:

174 g of diethylaminoethylamine 153 g of dimethylaminopropylamine 80 g of paraformaldehyde

| Analytical values: | |
|---|---|
| Amine number: | approximately 1060 mg of KOH/g |
| Viscosity/25° C.: | 25 mPa.s |
| Colour number: | 50 (APHA) |

TABLE 1

| Example | Accelerator Example | g of accelerator | Hardener | g of hardener | Resin | g of resin |
|---|---|---|---|---|---|---|
| 1 | — | — | ED 46[3] | 50 | EP 783[5] | 100 |
| 2 | 2 | 6 | " | " | " | " |
| 3 | 1 | 6 | " | " | " | " |
| 4 | 5 | 6 | " | " | " | " |
| 5 | 7 | 6 | " | " | " | " |
| 6 | 3 | 6 | " | " | " | " |
| Comparison 1 | DMP30[1] | | " | " | " | " |
| Comparison 2 | DMAPA[2] | | " | " | " | " |

TABLE 1-continued

| Example | Accelerator Example | g of accelerator | Hardener | g of hardener | Resin | g of resin |
|---|---|---|---|---|---|---|
| 7 | — | — | ED 43[4] | 60 | EP 783 | 100 |
| 8 | 2 | 5 | " | " | " | " |
| 9 | 1 | 5 | " | " | " | " |
| Comparison 3 | DMP30 | 5 | " | " | " | " |
| Comparison 4 | DMAPA | 5 | " | " | " | " |
| 10 | — | — | ED 350[6] | 50 | EP 783 | 100 |
| 11 | 2 | 8 | " | " | " | " |
| 12 | 1 | 8 | " | " | " | " |
| 13 | 6 | 8 | " | " | " | " |
| Comparison 5 | DMP30 | 8 | " | " | " | " |
| Comparison 6 | DMAPA | 8 | " | " | " | " |
| 14 | — | 5 | ED 350 | 50 | EP 710[7] | 100 |
| 15 | 2 | " | " | " | " | " |
| 16 | 1 | " | " | " | " | " |
| 17 | 6 | " | " | " | " | " |
| 18 | 3 | " | " | " | " | " |
| 19 | 1 | 2.5 | " | " | " | " |
| 20 | 1 | 10 | " | " | " | " |
| 21 | 2 | 10 | " | " | " | " |
| 22 | 3 | 10 | " | " | " | " |
| Comparison 7 | DMP30 | 5 | " | " | " | " |
| Comparison 8 | DMAPA | 5 | " | " | " | " |

[1]DMP30 = tris(dimethylaminomethyl)phenol
[2]DMAPA = N,N-dimethylaminopropylamine
[3]ED 46 = modified adduct based on cycloaliphatic and araliphatic amines and glycidyl ethers based on bisphenol A having an amine number (AV) of approximately 325
[4]ED 43 = modified adduct based on cycloaliphatic and araliphatic amines and glycidyl ethers based on bisphenol A having an AV of approximately 270
[5]EP 783 = modified epoxy resin based on bisphenol A and bisphenol F and aliphatic diluent having an EP value of 0.520
[6]ED 350 = polyaminoimidazoline having an AV of 390
[7]EP 710 = diglycidyl ether based on bisphenol A having an EP value of 0.54

TABLE II

| Example | Cure temperature °C. | Shore D hardness after days | | | | Gelling time min. | Gelling temperature °C. | Batch quantity g |
|---|---|---|---|---|---|---|---|---|
| | | 1 d | 2 d | 3 d | 7 d | | | |
| 1 | 23 | 52 | 73 | 76 | 79 | 70 | 23 | 150 |
| 2 | " | 66 | 77 | 78 | 80 | 80 | " | " |
| 3 | " | 77 | 80 | 80 | 81 | 54 | " | " |
| 4 | " | 75 | 79 | 80 | 81 | 62 | " | " |
| 5 | " | 76 | 80 | 80 | 81 | 70 | " | " |
| 6 | " | 68 | 79 | 80 | 81 | 85 | " | " |
| Comparison 1 | " | 77 | 80 | 80 | 81 | 46 | " | " |
| Comparison 2 | " | 77 | 79 | 79 | 80 | 42 | " | " |
| 7 | 40 | 74 | 77 | — | — | 17 | 40 | 150 |
| 8 | " | 79 | 80 | — | — | 19 | " | " |
| 9 | " | 79 | 80 | — | — | 14 | " | " |
| Comparison 3 | " | 79 | 81 | — | — | 10 | " | " |
| Comparison 4 | 40 | 77 | 79 | — | — | 10 | 40 | 150 |
| 10 | 23 | nm* | 22 | 50 | 73 | ~450 | 23 | 250 |
| 11 | " | nm* | 20 | 61 | 75 | ~500 | " | " |
| 12 | " | 56 | 71 | 73 | 76 | ~300 | " | " |
| 13 | " | 11 | 63 | 70 | 76 | ~350 | " | " |
| Comparison 5 | " | 55 | 74 | 75 | 78 | ~200 | " | " |
| Comparison 6 | " | 60 | 71 | 72 | 74 | ~180 | " | " |
| 14 | 23 | 4 | 65 | — | 81 | 330 | 23 | 250 |
| 15 | " | 5 | 67 | — | 81 | 360 | " | " |
| 16 | " | 35 | 75 | — | 82 | 230 | " | " |
| 17 | " | 8 | 71 | — | 82 | 260 | " | " |
| 18 | " | 3 | 65 | — | 81 | 345 | " | " |
| 19 | 23 | 5 | 69 | — | 82 | 285 | 23 | 250 |
| 20 | " | 56 | 78 | — | 81 | 205 | " | " |
| 21 | " | 3 | 66 | — | 81 | 390 | " | " |
| 22 | " | 2 | 59 | — | 82 | 405 | " | " |
| Comparison 7 | " | 42 | 75 | — | 82 | 200 | " | " |
| Comparison 8 | " | 43 | 76 | — | 82 | 150 | " | " |

*nm = not measurable

What is claimed is:

1. A curable mixture comprising an epoxy resin, an aminic hardener and a cure accelerator wherein there is used as cure accelerator from 1 to 20% by weight, based on epoxy resin, of at least one heterocyclic compound of the general formula (I)

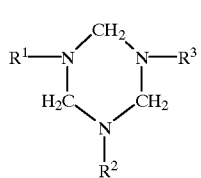

wherein $R^1$, $R^2$ and $R^3$, which may be the same or different, are

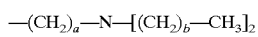

radicals in which a=2 or 3 and b=0 or 1.

2. A curable mixture according to claim 1, wherein there are used as cure accelerators compounds of formula (I) in which a=3 and b=0.

3. A curable mixture according to claim 1 consisting of:
   a) from 30 to 70% by weight, based on epoxy resin+hardeners, of epoxy resin having an EP value of from 0.4 to 0.56
   b) from 25 to 70% by weight, based on epoxy resin+hardeners, of aminic hardeners
   c) from 1 to 10% by weight, based on epoxy resin, of cure accelerator of the general formula (I).

4. A curable mixture according to claim 3, wherein there is used as an epoxy resin a liquid glycidyl ether based on bisphenol A and/or bisphenol F.

5. A curable mixture according to claim 1, further comprising one or more solvents, plasticisers, UV stabilizers, dyes, pigments, and/or fillers.

* * * * *